July 9, 1968  J. K. RYE ET AL  3,392,255

ELECTRICAL DISINTEGRATION MACHINE

Filed Oct. 26, 1964  10 Sheets-Sheet 1

INVENTORS
JOHN K. RYE,
ORVAL A. OPPERTHAUSER,
RICHARD W. AGNELLO & JAMES W. STEWART
BY
Barnes, Kisselle, Raisch, & Choate
ATTORNEYS

INVENTORS
JAMES K. RYE, ORVAL A. OPPERTHAUSER,
RICHARD W. AGNELLO & JAMES W. STEWART
BY
Barnes, Kisselle, Raisch & Choate
ATTORNEYS July 9, 1968   J. K. RYE ET AL   3,392,255
ELECTRICAL DISINTEGRATION MACHINE
Filed Oct. 26, 1964   10 Sheets-Sheet 3

INVENTORS
JOHN K. RYE, ORVAL A. OPPERTHAUSER,
RICHARD W. AGNELLO & JAMES W. STEWART
BY
Barnes, Kisselle, Raisch & Choate
ATTORNEYS July 9, 1968    J. K. RYE ET AL    3,392,255
ELECTRICAL DISINTEGRATION MACHINE
Filed Oct. 26, 1964    10 Sheets-Sheet 5

INVENTORS
JOHN K. RYE, ORVAL A. OPPERTHAUSER,
RICHARD W. AGNELLO & JAMES W. STEWART
BY
*Barnes, Kisselle, Raisch & Choate*
ATTORNEYS July 9, 1968 J. K. RYE ET AL 3,392,255
ELECTRICAL DISINTEGRATION MACHINE
Filed Oct. 26, 1964

INVENTORS
JOHN K. RYE, ORVAL A. OPERTHAUSER,
RICHARD W. AGNELLO & JAMES W. STEWART
BY
*Barnes, Kisselle, Raisch & Choate*
ATTORNEYS

INVENTORS
JOHN K. RYE, ORVAL A. OPPERHAUSER,
RICHARD W. AGNELLO & JAMES W. STEWART
BY
Barnes, Kisselle, Raisch, & Choate
ATTORNEYS Fig. 20
Fig. 19

3,392,255
ELECTRICAL DISINTEGRATION MACHINE
John K. Rye, Beverly Hills, Richard W. Agnello, Farmington Township, Oakland County, James W. Stewart, Southfield Township, Oakland County, and Orval A. Opperthauser, Bloomfield Township, Oakland County, Mich., assignors to F. Jos. Lamb Co., Warren, Mich., a corporation of Michigan
Filed Oct. 26, 1964, Ser. No. 406,271
28 Claims. (Cl. 219—68)

ABSTRACT OF THE DISCLOSURE

A machine for removing metal by electrical disintegration having a rotary spindle on which the electrode wheel is mounted and a carriage on which the workpiece to be machined and an electrode dressing tool are carried. Translatory movement of the carriage is imparted thereto by an axially reciprocating feed bar having a lost motion connection with the carriage and also having a friction driving connection with a rotatable work supporting spindle mounted on the carriage so that when the feed bar is moved relative to the carriage the workpiece is rotated and when the feed bar has established a driving connection with the carriage the workpiece and the wheel dressing tool are shifted to and from operative positions with respect to the electrode wheel.

---

This invention relates to a machine for removing metal by electric disintegration, and more particularly to an electric disintegration machine employing a rotary electrode wheel for establishing an arc with the workpiece being machined.

It is an object of this invention to provide a machine of the type described which is admirably suited for machining various contours on workpieces such as form cutting tools.

A further object of the invention resides in the provision of a machine of the type described which is admirably suited for machining various contours on cylindrical workpieces.

Another object of the invention is to provide a machine of the type described which is substantially completely automatic in its operation, in the sense that after its cycle is initiated the machine will automatically control itself both with respect to feeding of the workpiece and the electrode wheel and controlling the discharge current between the electrode and the workpiece, so as to initially dress the electrode wheel, then machine the workpiece and thereafter return the machine elements to their starting position, so as to condition the machine for machining a successive workpiece or for executing another cut on the same workpiece.

A still further object of the invention is to provide in a machine of the type described a novel drive arrangement for the carriage which supports the workpiece to be machined and the electrode wheel dressing tool.

General arrangement

Figure 1:
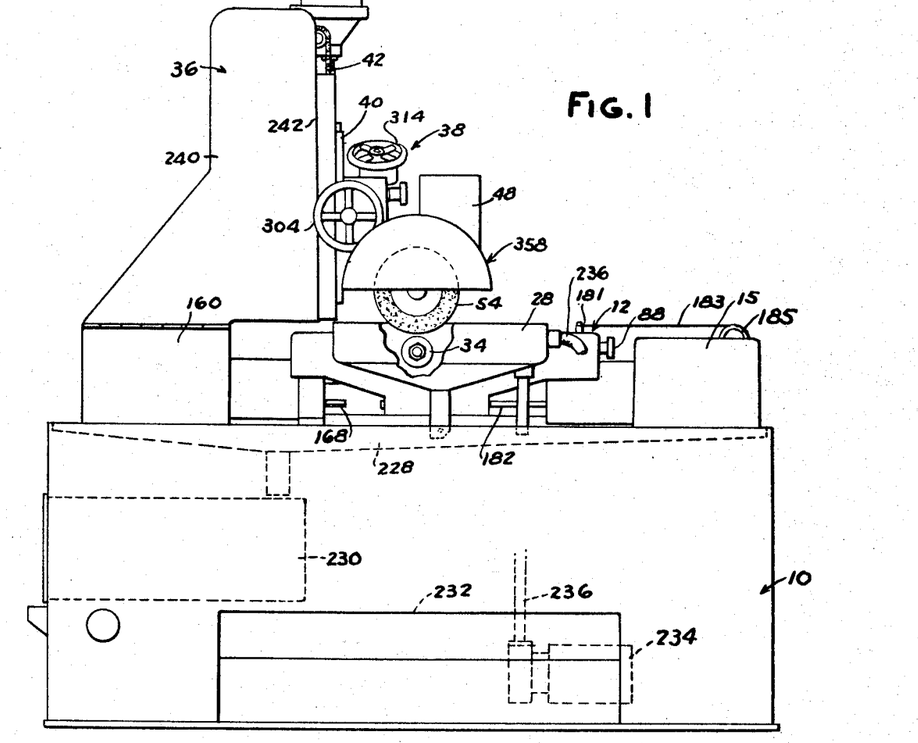
FIG. 1 is a front elevational view with parts broken away of the electrical disintegration machine of the present invention.
Figure 4:
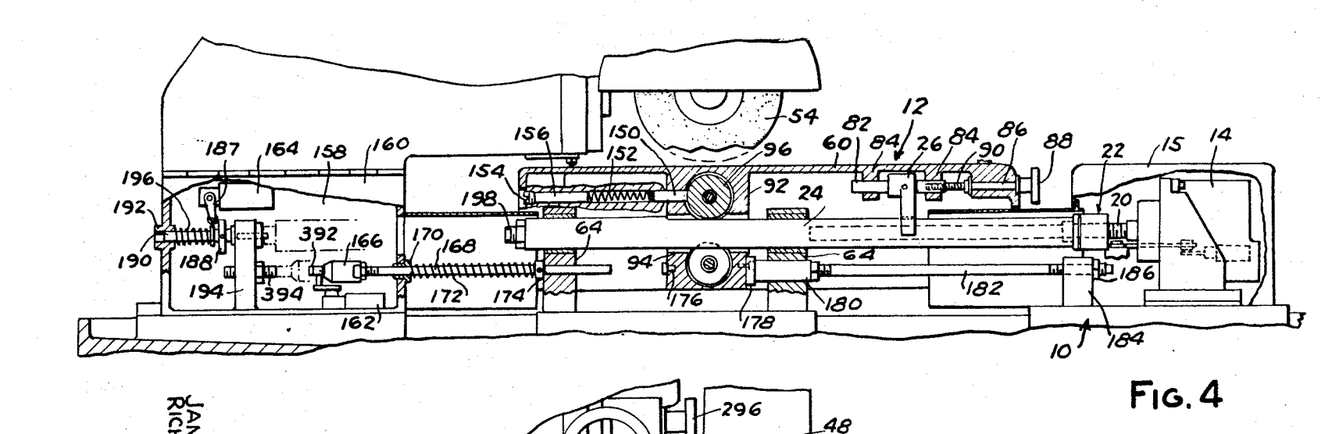
FIG. 4 is a fragmentary longitudinal sectional view of the machine illustrating the drive and controls for the machine carriage.
Figure 5:
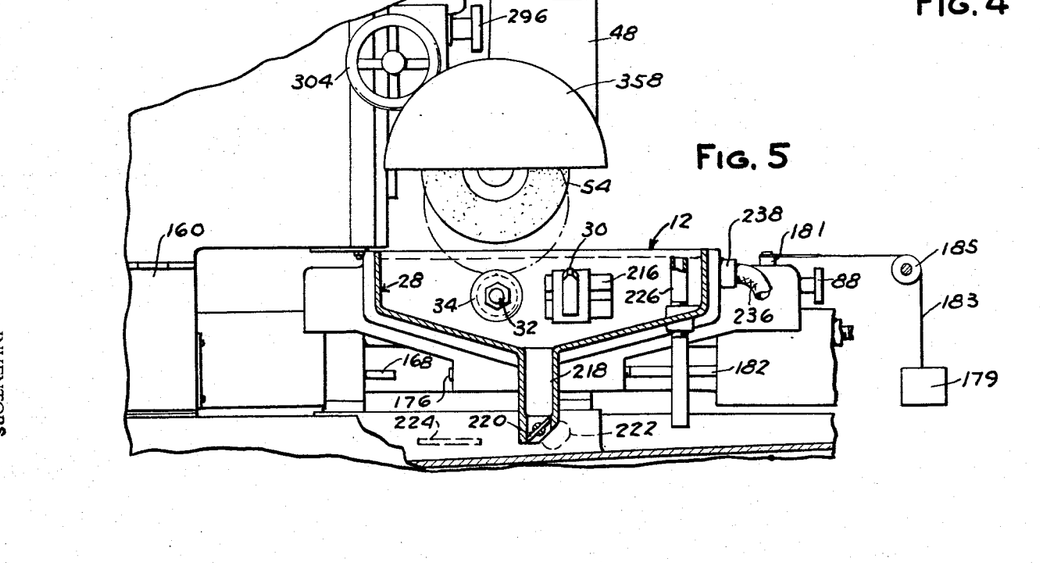
FIG. 5 is a fragmentary front elevational view of a portion of the machine with the carriage in the workpiece machining position and showing the dielectric liquid tank in longitudinal vertical section.
Figure 10:
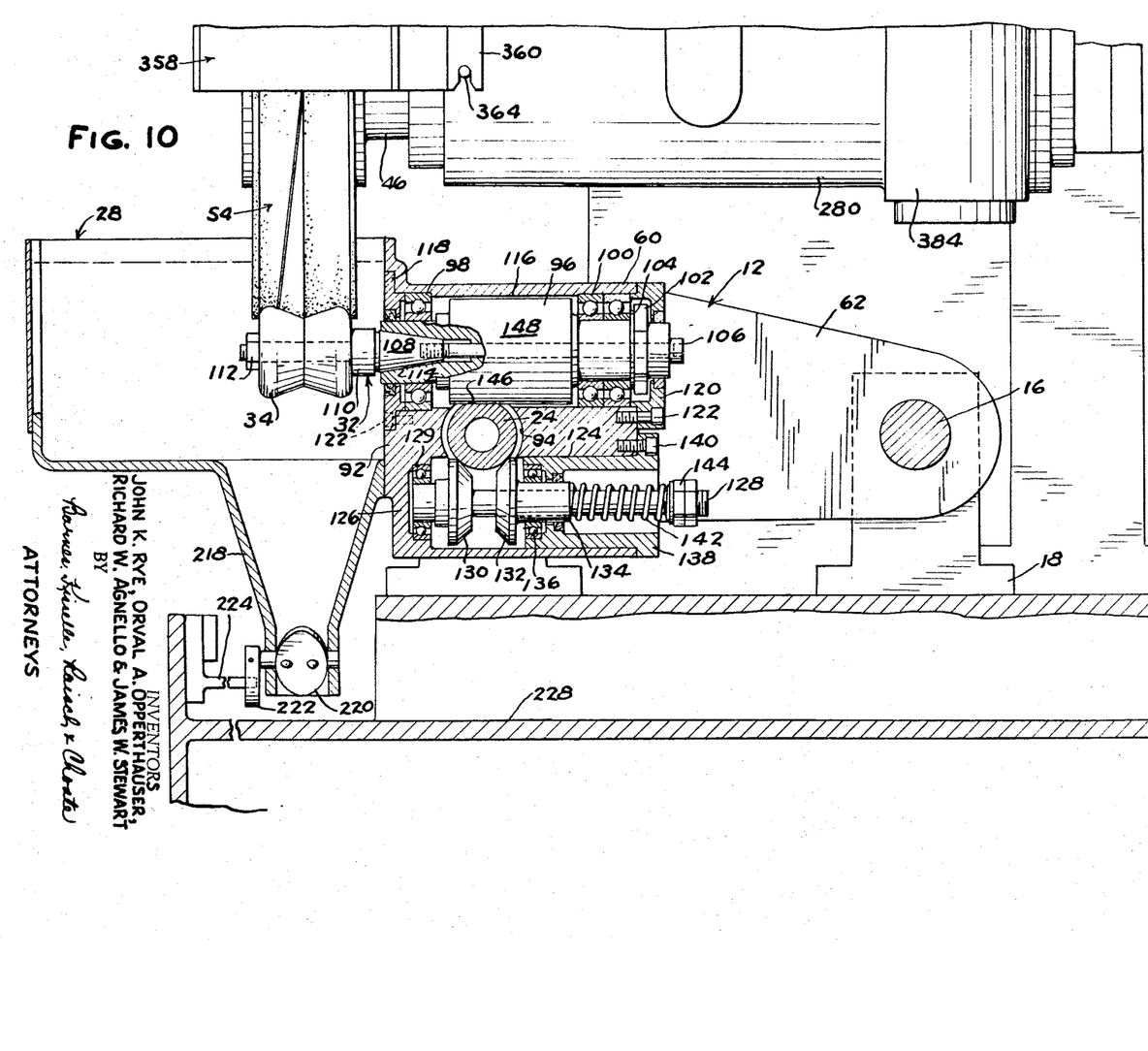
FIG. 10 is a fragmentary end view of the machine with the carriage and its drive mechanism illustrated in section.

Referring to FIG. 1, the machine generally comprises a base 10 on which there is mounted a carriage 12 for movement longitudinally of the base 10. The power for driving carriage 12 longitudinally of the base is derived from a motor 14 (FIG. 4) enclosed by a cover 15. Carriage 12 is guided for movement longitudinally of the machine by a guide bar 16 which extends lengthwise of and is fixedly supported on base 10 by supports 18 (FIG. 10). Motor 14 drives a feed screw 20 on which is threaded a nut 22 secured to one end of a feed bar 24 (FIG. 4). As motor 14 rotates in one direction, feed bar 24 is advanced to the left, as viewed in FIG. 4, to a position wherein a yoke 26 on carriage 12 is engaged by nut 22 to feed the carriage 12 in a direction toward the left. On the front side of carriage 12 there is mounted a dielectric liquid tank 28 within which there is adjustably supported a wheel dresser 30. There is also mounted on carriage 12 a work-supporting arbor 32 (FIGS. 5 and 10), the work-supporting end of which projects into tank 28 so that a workpiece 34 can be mounted thereon.

There is also mounted on base 10 a support column assembly 36 on which a spindle assembly 38 is arranged for vertical movement. Column assembly 36 includes a slide 40 which is adjusted vertically by means of a screw 42 driven by a motor 44. Spindle assembly 38 is supported on slide 40 and the electrode wheel spindle 46 (FIG. 11) of spindle assembly 38 is driven by a motor 48 through a worm gear and wheel 50, 52. On the free end of spindle 46 there is mounted an electrode wheel 54.

*Carriage assembly and drive*

Carriage 12 comprises a casting 60 formed with a pair of rearwardly extending integral arms 62 slidably supported on guide bar 16 (FIG. 10). Guide bar 16 thus slidably supports the carriage at the rear side thereof for rectilinear movement lengthwise of the machine. However, the carriage is also supported by the feed bar 24 in the manner illustrated in FIG. 10. Feed bar 24 is slidably supported by a pair of spaced bearing blocks 64.

Referring now ot FIGS. 6 through 9, it will be observed that the nut 22 which interconnects feed screw 20 with feed bar 24 is threaded on screw 20 as at 66 and has a pin 68 thereon which extends into an adjacent ring 70. Ring 70 is keyed as by a pin 72 to a secondary nut 74 connected to the end of feed bar 24 by screws 76. Nut 74 is also threaded on feed screw 20. Ring 70 has a plurality of circumferentially spaced openings 78 therein for receiving pin 68. A compressible rubber spacer 80 is interposed between ring 70 and nut 74. With this arrangement, the backlash of the threaded connection between feed bar 24 and feed screw 20 can be eliminated by advancing nut 22 on the feed screw toward nut 74, so as to compress spacer 80. Then pin 68 is inserted into the hole 78 in ring 70 with which it axially aligns. The backlash in this nut assembly can thus be controlled as desired by controlling the extent to which spacer 80 is compressed.

As is illustrated in FIG. 4 yoke 26 is pinned to a sleeve 82, which is slidably supported by a pair of depending lugs 84 within the carriage casting 60. A screw 86 provided with a turning knob 88 is journalled in casting 60, and has its free end 90 threaded into sleeve 82, so that as the knob is rotated, yoke 26 is shifted axially of feed bar 24, that is, longitudinally of carriage 12.

Referring now to FIGS. 4 and 10, the carriage casting 60 has a heavy boss 92 depending on the underside thereof which is formed with a through opening 94 for accommodating feed bar 24. Arbor 32 is journalled in bore 116 formed in boss 92. The arbor comprises a stub shaft 96 supported at one end in bore 116 by a radial bearing 98 and at its opposite end by thrust bearing 100. Stub shaft 96 is locked axially in position by a lock nut 102 and a lock washer 104. A screw 106 extending axially through shaft 96 engages the cone-shaped end 108 of an arbor 110 on which the workpiece to be machined is retained by means of a nut threaded on the end of the arbor 112. By means of screw 106 the cone-shaped portion 108 of the arbor is drawn into tight engagement with a conical recess 114 in shaft 96, which is concentric with the axis of the shaft. The opposite ends of bore 116 in which shaft 96 is journalled are closed by end caps 118 and 120, respectively, which are secured to the opposite end faces of boss 92 by screws 122.

Boss 92 is fashioned with a second bore 124, the axis of which is vertically aligned with the bore 116. Bore 124 is closed at the front side of the carriage as at 126 and is open at the rear side of the carriage. Within bore 124 there is arranged a spindle 128, the inner end of which is journalled in the blind end of bore 124 by a bearing 129. Formed integrally with spindle 128 or fixed thereon is a frusto-conical roller 130. There is also slidably supported on spindle 128 a second frusto-conical roller formed with a sleeve portion 134 which is journalled by a bearing 136 in a cylindrical bearing socket cap 138 having a close fit in bore 124 and retained therein by screws 140. A spring 142, bearing at end end against the end of sleeve 134 and at its opposite end against a pair of adjusting nuts 144 on the threaded outer end of spindle 128, urges conical roller 132 axially on spindle 128 toward roller 130. Thus the two rollers 130 and 132 frictionally engage the lower side of the outer cylindrical surface of feed bar 24 urging the carriage downwardly and thus assuring the flattened top portion 146 of feed bar 24 with the cylindrical surface 148 of shaft 96.

With this arrangement it will be observed that relative longitudinal movement between carriage 12 and feed bar 24 causes shaft 126 to rotate, and in view of the fact that the spindle 110 which supports the workpiece 34 is tightly gripped by shaft 96 at the conical portion 108, the workpiece 34 rotates in unison with shaft 96. However, it is desirable to prevent shaft 96 from rotating too freely. Accordingly, a drag is applied to shaft 96 by means of a pin 150 (FIG. 4) which is urged against the cylindrical surface 148 of shaft 96 by means of a spring 152. The tension of spring 152 is adjusted by a set screw 154 which bears against one end of a pin 156, which in turn bears against one end of spring 152.

At the end of base 10 opposite motor 14 and axially aligned therewith there is a switch-box 158 closed by a hinged cover 160. Within switch-box 158 there are arranged two limit switches 162 and 164. Limit switch 162 is adapted to be actuated when its switch arm 163 is engaged by an abutment 166 adjustably threaded at one end of a rod 168. Rod 168 is slidably supported adjacent one end by a bushing 170 in the side wall of switch-box 158. The opposite end of rod 168 is slidably mounted in the adjacent bearing block 64 on the base of the machine. A spring 172 encircling rod 168 bears at one end against bushing 170 and at its opposite end against a collar 174 which is mounted on rod 168 for axial adjustment. Spring 172 urges rod 168 in a direction toward the right, as viewed in FIG. 4, to a position wherein collar 174 abuts against the adjacent bearing block 64. The heavy boss 92 on the carriage casting 60 has a rest button 176 mounted therein in axial alignment with the end of rod 168. If desired, the opposite side of the heavy boss 92 of the carriage casting may have fixed thereto a magnet armature plate 178.

A permanent magnet 180 is adjustably threaded on one end of a rod 182 and is supported by the other bearing block 64. The other end of rod 182 is threaded into a support 184 on base 10 and locked thereto by a lock nut 186. This arrangement enables the magnet 180 to be adjusted in a direction axially of rod 182. Magnet 180 is axially aligned with the armature plate 178. Thus when the carriage is shifted in a direction to the right to the position shown in FIG. 4, the magnetic attraction between magnet 180 and armature plate 178 resists movement of carriage 12 in a direction to the left as viewed in FIG. 4, until the nut 22 engages the yoke 26 which straddles feed bar 24. For assuring retention of the carriage in the position illustrated in FIG. 4, a counterbalance 179 is connected to the carriage as at 181 by a cable 183 which extends around an idler roller 185.

The other limit switch 164 in switch-box 158 is adapted to be actuated when its arm 187 is engaged by a disk 188 adjustably fixed on a rod 190. Rod 190 is slidably supported in a bushing 192 in a wall of switch-box 158, and by an upright support 194 within the switch-box. A spring 196 urges rod 190 in a direction to the right, as viewed in FIG. 4, to a position wherein one end of the rod projects outwardly through support 194 in axial alignment with a contact button 198 mounted for axial adjustment at the outboard end of feed bar 24.

Figure 17:
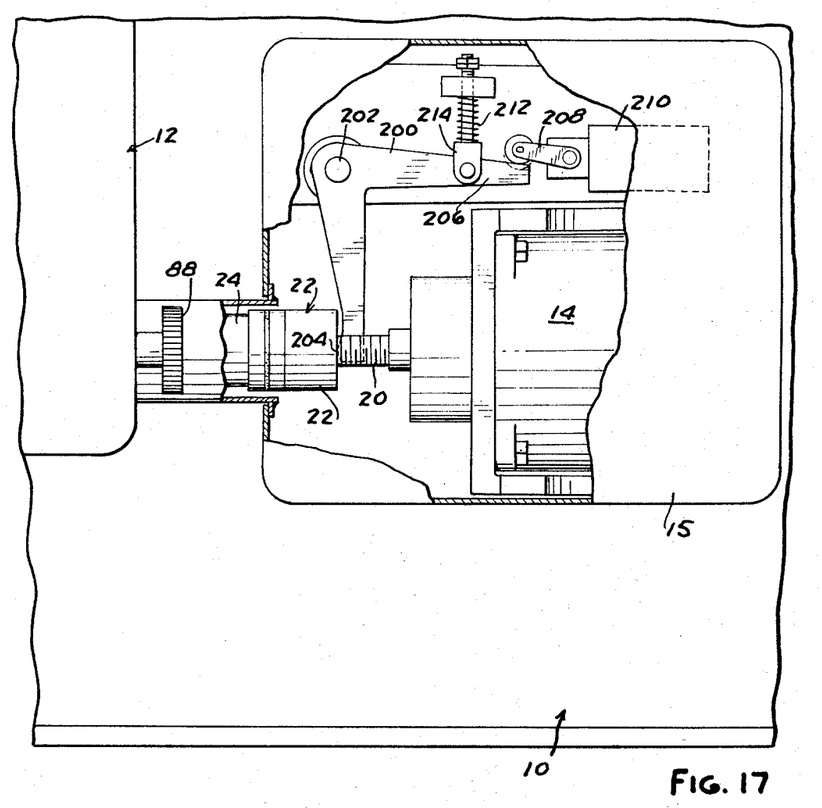
FIG. 17 is a fragmentary top plan view of the right-hand end of the machine as viewed in FIG. 1, with parts broken away.
Figure 18:
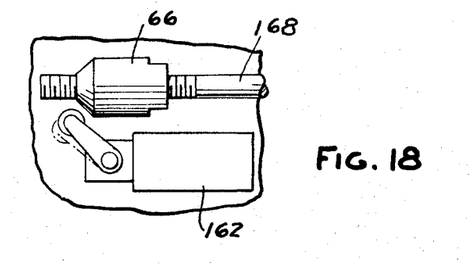
FIG. 18 is a view showing one of the limit switches on the machine.

Referring now to FIG. 17, it will be noted that adjacent motor 14 there is arranged a bell crank 200 pivotally supported as at 202. One end of bell crank 200 is adapted to be contacted by nut 22, as at 204, when feed bar 24 is retracted to the position shown in FIG. 4. The other end 206 of bell crank 200 is adapted to actuate the arm 208 of a limit switch 210. Bell crank 200 is biased in a clockwise direction, as viewed in FIG. 17, by a spring 212 acting against a clevis rod 214 pivotally connected to bell crank 200 adjacent its end 206.

Figure 6:
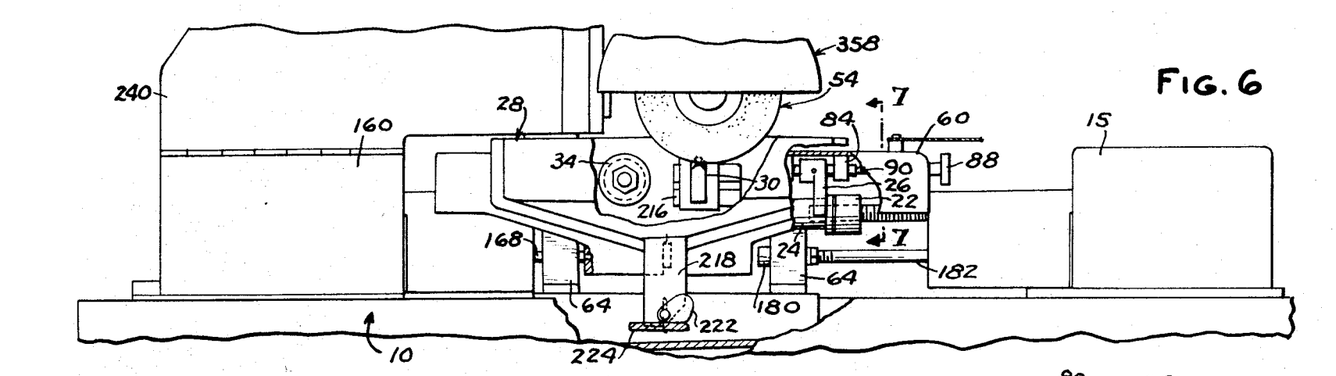
FIG. 6 is a fragmentary front elevational view of a portion of the machine with the carriage in the cycle starting position.
Figures 7, 8, 9:
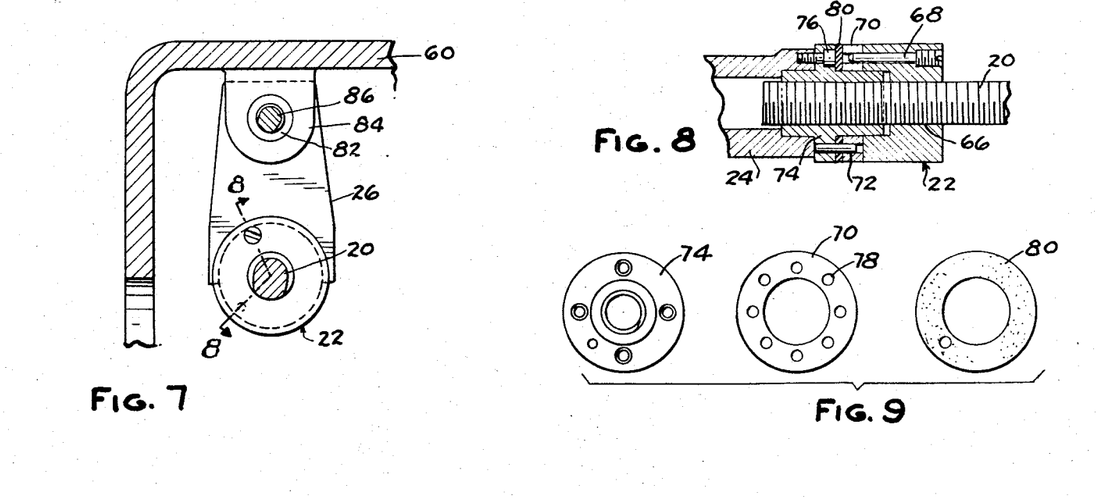
FIG. 7 is a sectional view along the line 7—7 in FIG. 6.
FIG. 8 is a sectional view along the line 8—8 in FIG. 7.
FIG. 9 is a view showing three elements of the antibacklash device on the feed screw.

Referring now to FIGS. 1, 5, 6 and 10, it will be noted that the dielectric liquid tank 28 is mounted on the front side of carriage casting 60 with the arbor 32 projecting therein. A dovetail block 216 on the wall of tank 28 supports the wheel dresser 30 for adjustment toward and away from the axis of arbor 32. The bottom wall of tank 28 slopes downwardly toward the center where it is provided with an outlet 218 controlled by a butterfly valve 220. A weighted cam member 222 on the end of the shaft on which valve 220 is mounted normally retains the valve in closed position. However, when the carriage shifts in a direction to the left, as viewed in FIGS. 1 and 5, member 22 is adapted to engage a lug 224 on the base of the machine and thereby pivot valve 220 to the open position, as is illustrated in FIG. 6. Within the tank 28 there is arranged a standpipe 226, the upper end of which lies in a plane slightly below the upper edge of the tank. The lower end of the standpipe is adapted to discharge into the trough structure 228 on the base of the machine. Trough 228 discharges into a settling tank 230 which is in turn connected to a sump 232 in which a pump 234 is located. The outlet of pump 234 is connected by a flexible rubber hose 236 with an inlet fitting 238 on tank 28. Suitable filters, not shown, are of course provided in the fluid circulating system.

*Column assembly*

Figure 13:
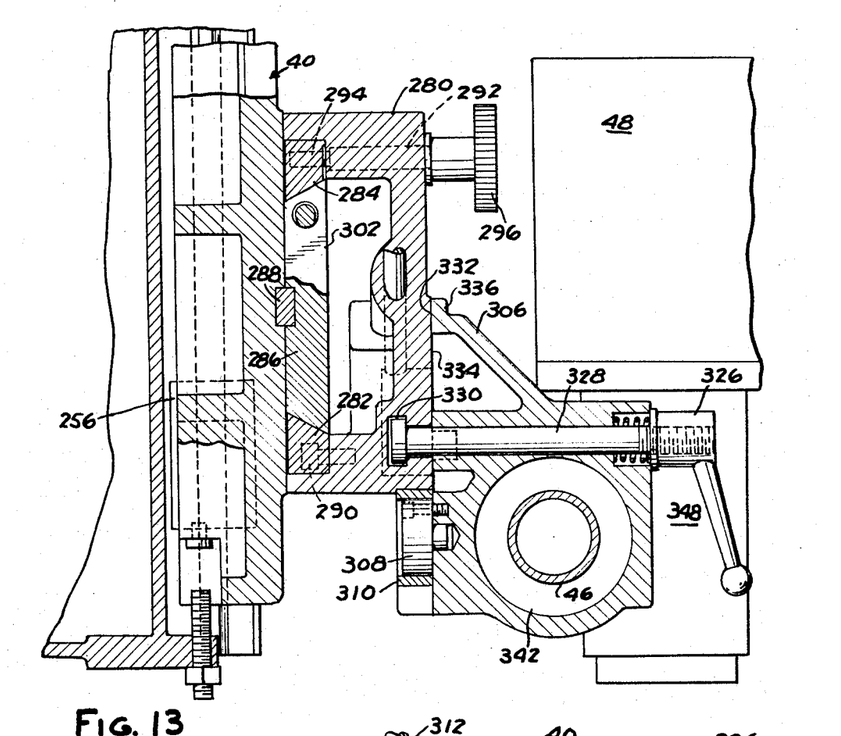
FIG. 13 is a fragmentary sectional view taken along the line 13—13 in FIG. 11.
Figures 19, 20:
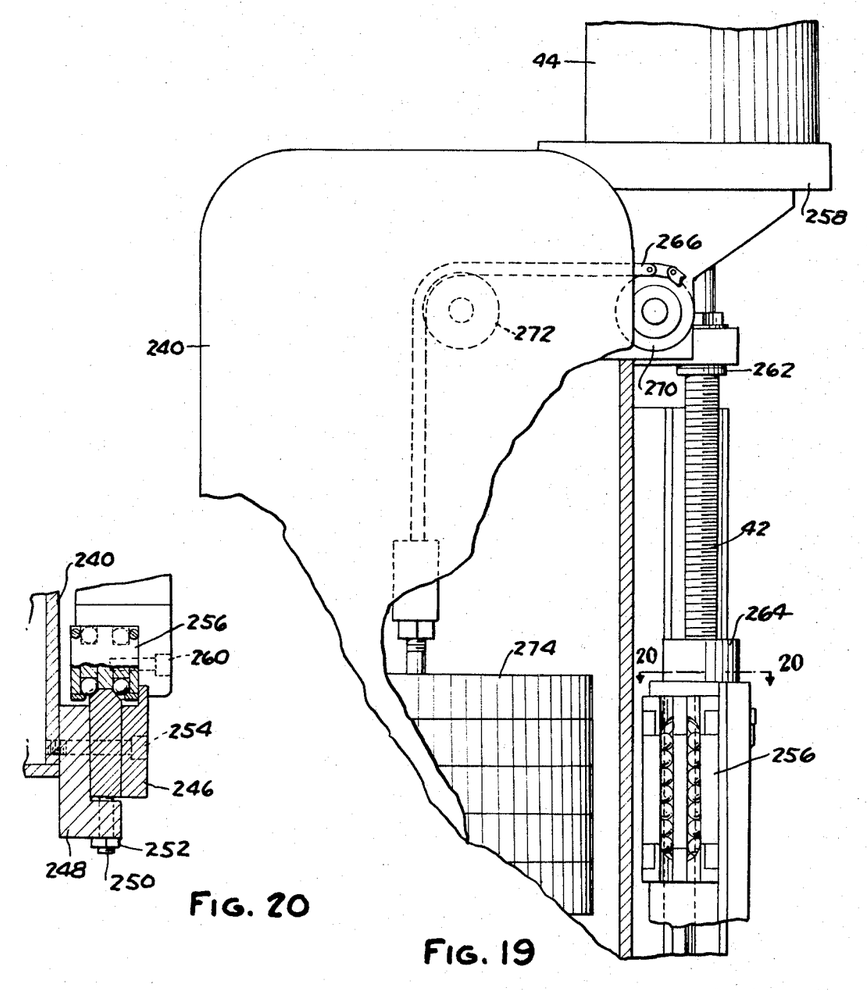
FIG. 19 is a fragmentary elevational view of the column assembly with parts broken away to better illustrate the construction thereof.
FIG. 20 is a fragmentary sectional view taken along the line 20—20 in FIG. 19.

The column assembly 36 comprises a casting 240 (FIG. 11) which serves as a housing, on the front face 242 of which there is mounted a pair of vertically extending ways 244 and 246. Way 244 is fixedly secured to housing 240 by screws 247. The other way 246 is adjustably mounted on an upright plate 248 (FIG. 20) which is in turn secured to housing 240. Set screws 250 with lock nuts 252 are provided on plate 248 for adjusting way 246 toward and away from way 244. When the proper adjustment is obtained the way assembly is securely clamped to housing 240 by tightening screws 254. Ways 244 and 246 are arranged for guiding the vertical movement of slide 40. Slide 40 is guided for vertical movement on ways 244 and 246 by four linear bearing cartridges 256 which are located two adjacent the upper corners of the slide (FIG. 11) and two adjacent the lower corners of the slide (FIG. 13). Bearing cartridges 256 are fixedly secured to the slide by screws 260. By reason of the adjustable way 246 the bearing cartridges 256 can be preloaded so that the vertical travel of slide 40 is accurate to a high degree. This is essential because the whole spindle assembly 38, and consequently the electrode wheel 54, moves vertically with slide 40.

The means for shifting slide 40 vertically, as mentioned previously, comprise a motor 44 and a feed screw 42. Motor 44 is mounted on housing 240 by a suitable support bracket 258 and the shaft thereof is connected to feed screw 42 by a coupling 260. The upper end of feed screw 42 is journalled in a bearing 262 mounted on support bracket 258. On the upper end of slide 40 there is secured a nut 264 which is engaged with the thread of feed screw 42. The construction of nut 264 is similar to the described construction of nut 22 with respect to the means for eliminating any backlash between nut 264 and feed screw 42. Motor 44, as well as motor 14, are of the stepping type, that is, current is fed to these motors in the form of pulses which produce incremental rotation of the shafts of these motors.

Since the whole spindle assembly 38 is supported on slide 40, it is desirable to reduce the load on motor 44 by counterbalancing the weight of slide 40 and the spindle assembly carried thereon. The counterbalancing mechanism comprises a pair of chains 266 which are connected at one end to the upper end of the slide as at 268. Each chain 266 is trained over a pair of idler sprockets 270 and 272. The other ends of the chains 266 support weight 274 which approximate the weight of the slide 40 and spindle assembly 38. By reason of this arrangement, the power required of motor 44 is reduced substantially to only that required to overcome the inertia of slide 40 and spindle assembly 38.

*Spindle assembly*

The spindle assembly 38 comprises a horizontal slide 280 (FIGS. 11 and 13) in the form of a casting having gibs 282 and 284, which are adapted to engage with a dovetail guide 286 secured to slide 40 by screws not illustrated and keyed thereto as at 288. Gib 282 is fixedly mounted on slide 280 by screws 290, whereas gib 284 is shiftably mounted on slide 280. The slide is adapted to be clamped in position on dovetail guide 286 by a screw 292 which threads into gib 284 as at 294, the screw being provided with a turning knob 296 at the outer end thereof. As screw 292 is tightened, gib 284 is brought into tight engagement with one side of dovetail guide 286, so as to securely clamp the horizontal slide 280 to the vertical slide 40. Horizontal slide 280 is adapted to be adjusted in a direction horizontally on slide 40 by means of a screw 298 (FIG. 11) which is journalled in one end of slide 280 as at 300. Screw 298 threads into a vertical rib 302 on slide 40 and has a handwheel 304 keyed to the outer end thereof. Screw 298 is relatively short, because the extent of horizontal movement required of slide 280 is relatively small.

Figure 14:
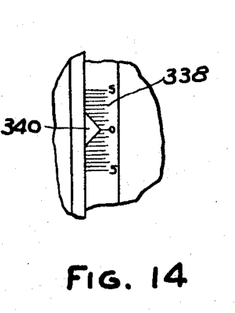
FIG. 14 is a fragmentary plan view in the direction of the arrow 14 in FIG. 11.
Figures 15, 16:
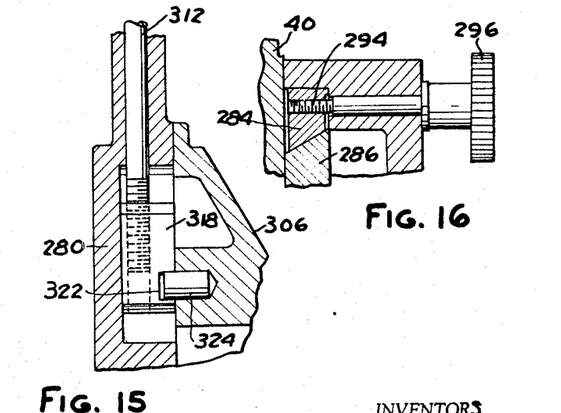
FIG. 15 is a fragmentary sectional view taken along the line 15—15 in FIG. 11.
FIG. 16 is a fragmentary sectional view taken along the line 16—16 in FIG. 11.

A spindle housing 306 is pivotally supported on horizontal slide 280 by means of a circular boss 308 on housing 306, which is journalled in a bearing 310 mounted in slide 280 (FIG. 13). A screw 312 provided with a handwheel 314 at one end is utilized for effecting angular adjustment of slide housing 306 relative to horizontal slide 280. Screw 312 is journalled for rotation in a boss 316 in slide 280, and at its end opposite handwheel 314 screw 312 threads into a slide block 318 slidably retained in a groove 320 on the outer face of slide 280. Slide block 318 has a transverse groove 322 which receives a pin 324 mounted on the inner face of spindle housing 306. With this arrangement as screw 312 is rotated in either one direction or the other, slide block 318 is shifted longitudinally of groove 320 and the interconnection of pin 324 in the transverse groove 322 in slide block 318 causes the spindle housing 306 to shift angularly about circular boss 308. The angular adjustment required of spindle housing 306 is relatively small, in view of the manner in which the electrode wheel 54 is designed to operate on a workpiece such as illustrated at 34. After the proper angular adjustment of spindle housing 306 is obtained, it is adapted to be tightly clamped in the adjusted position by a nut 326 which is threaded on the end of a screw 328, the head of which is retained in a slightly arcuate slot 330 in the outer face of slide 280. As nut 326 is tightened, the inner planar face 332 of spindle housing 306 is clamped tightly against the outer planar face 334 of slide 280. The upper portion 336 of spindle housing 306 is arcuately shaped about boss 308 as a center and graduations 330 are provided thereon so that the angular adjustment of housing 306 relative to slide 280 is visually indicated by the pointer 340 (FIG. 14).

Housing 306 is formed with a through bore 342 in which spindle 46 is journalled as by bearings 344. The rear end of bore 342 is closed by a cap 346. Motor 48 is supported on housing 306 by a circular boss 348 so that its shaft 350 extends downwardly through the boss and transversely of spindle 46. Worm gear 50 is mounted on the shaft 350 of motor 48 and worm wheel 52, which meshes with worm gear 50, is keyed to spindle 46.

Electrode wheel 54 is mounted by suitable means on the forward end of spindle 46. Wheel 54 is preferably formed of two discs 352 and 354. These discs have their outer faces lying in parallel planes perpendicular to the axis of spindle 46. The inner surfaces of discs 352 and 354 are in coplanar engagement and inclined at a slight angle to the axis of spindle 46, as indicated at 356.

The top half of electrode wheel 54 is enclosed by a cover 358. Cover 358 has a mounting portion 360 which may be formed of metal and removably secured to spindle housing 306, as by a screw 362 and a pin 364. The cover 358 also includes two side plates 366 of generally semi-circular shape. These side plates 366 are formed of an electrical insulating material such as Micarta. The two side plates 366 are interconnected by a semi-circular shroud piece 368.

Figures 11, 12:
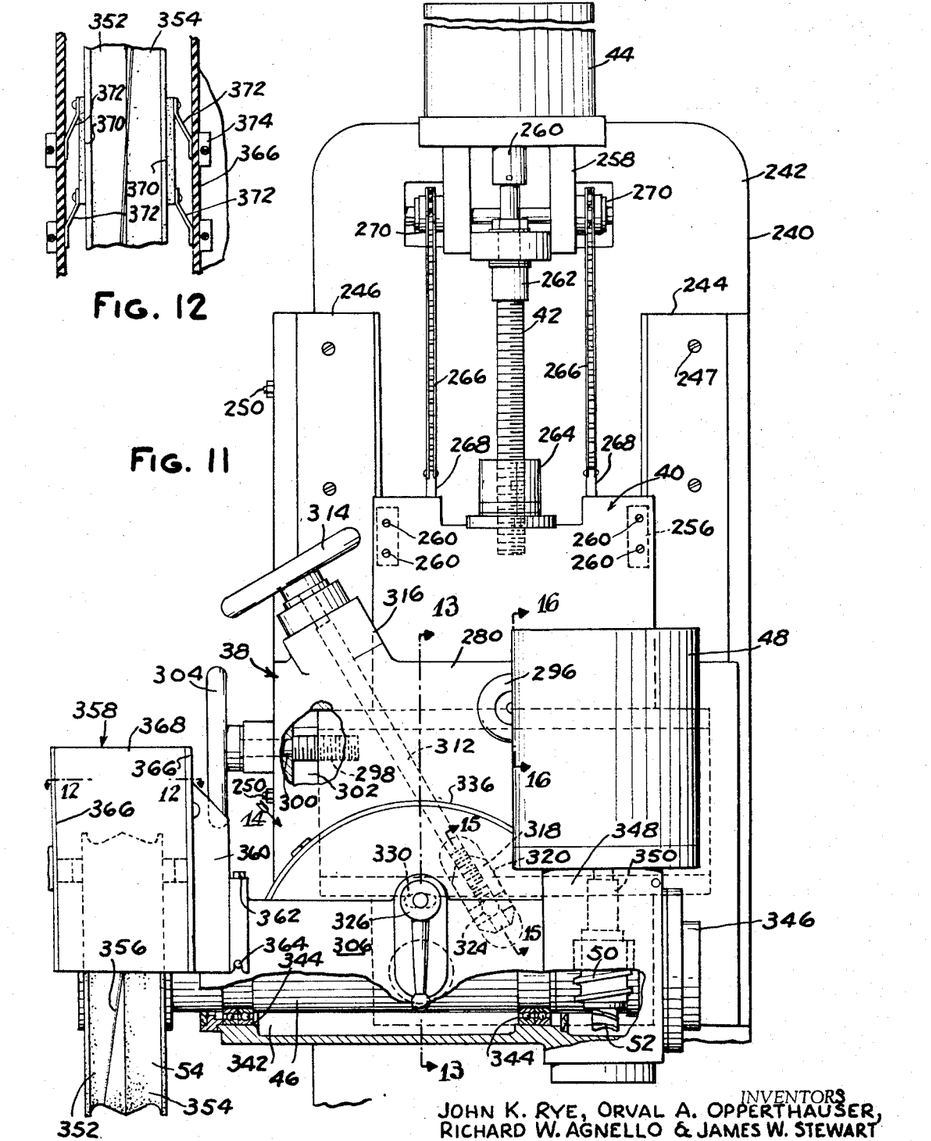
FIG. 11 is a fragmentary elevational view of the column assembly with parts broken away, to better illustrate the construction thereof.
FIG. 12 is a fragmentary view taken along the line 12—12 in FIG. 11 and illustrating the contact brush arrangement for the electrode wheel.

In FIG. 12 there is illustrated the arrangement for conducting electrical current to electrode wheel 54. Electrode wheel 54 is preferably formed of a relatively hard carbonaceous material. Such material can be formed radially to the desired contour at the face of the wheel, and provides an excellent conductor for the current. The current is conducted to two discs 352 and 354 of wheel 54 by brushes 370. Brushes 370 are retained one against each of the opposite faces of wheel 54 by springs 372 which are formed of an electrical conducting material, such as beryllium copper. Springs 372 are in the nature of leaf springs, having one end connected to the brushes 370 and the opposite ends connected to the micarta side plates 366 of cover 358. Suitable terminals 374 are mounted on the outer faces of side plates 366 and in conducting relation with the springs 372 for electrically connecting the current leads to the electrode wheel. The power leads to the wheel extend from a radio frequency power supply unit hereinafter more specifically described.

Figure 21:
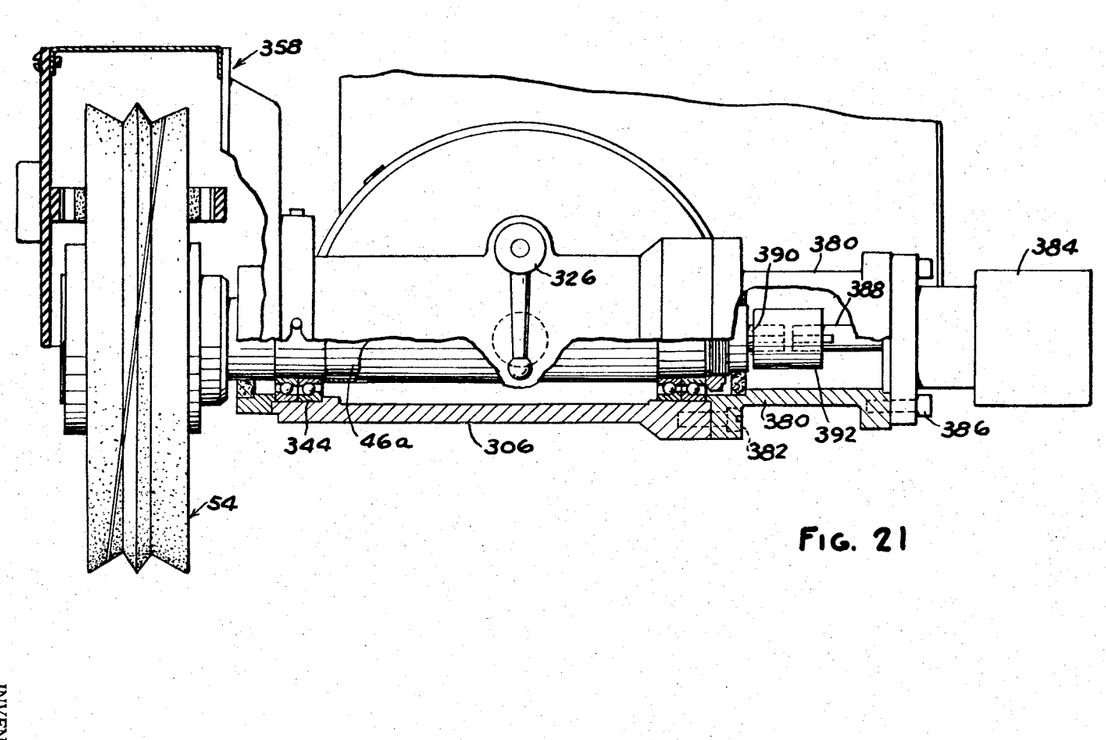
FIG. 21 is a fragmentary elevational view with parts broken away and showing a modified form of device for the electrode wheel.

The modified form of spindle assembly shown in FIG. 21 differs from that shown in FIG. 13 primarily in that the spindle 46a is driven hydraulically rather than by an electric motor. In the arrangement illustrated in FIG. 21 the rear end of spindle housing 306 has an extension 380 mounted thereon as by screws 382. A hydraulic motor 384 is mounted on extension 380 by screws 386. The output shaft 388 of motor 384 is connected to a stub shaft portion 390 of spindle 46a by a coupling 392 which provides a direct drive between motor 384 and spindle 46a. The rise of a direct drive to spindle 46a from hydraulic motor 384 results in an extremely smooth operation of the spindle. This is important because any vibration in the wheel spindle can produce substantial variations in the length of the voltage gap between the electrode wheel and the surface of the workpiece being machined. For example, a finish cut on a workpiece might be performed with a gap length of .00015″. Thus even a slight vibration in the wheel could easily vary the gap length 100%. Since the relative feeding action of the wheel into the workpiece is controlled by a circuit which senses the gap voltage, the need for smooth operation of the electrode wheel is obvious.

*Operation*

Figure 2:
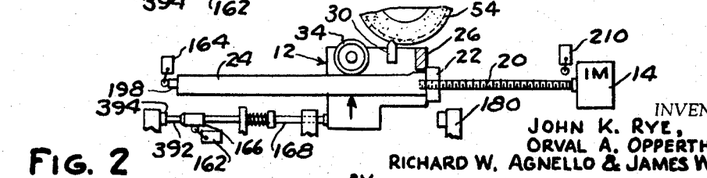
FIGS. 2 and 3 are schematic views illustrating generally the cycle of operation of the machine, FIG. 2 showing the machine with the electrode wheel in the dress position and FIG. 3 showing the relative positions of the machine elements at the end of a machining cycle.
Figure 3:
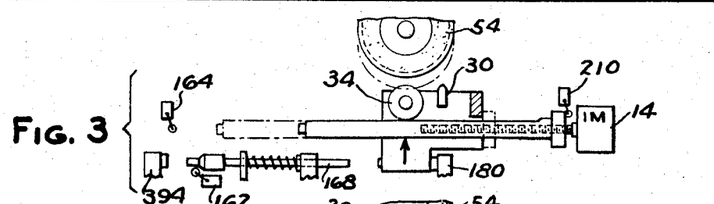
Figure 22:
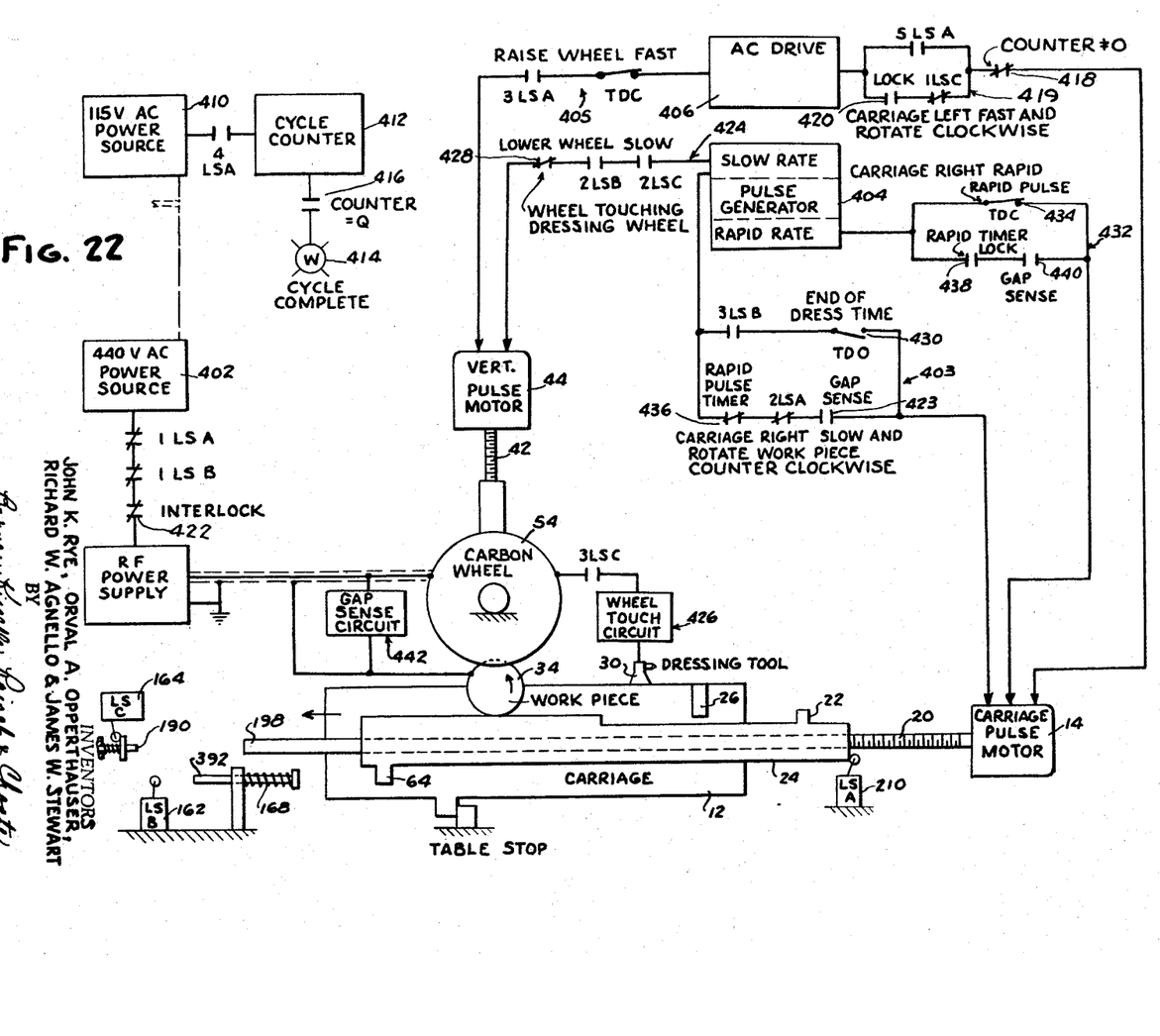
FIG. 22 is a diagrammatic view showing the general electrical circuit.

The operation of the machine is best understood by referring to the schematic views of FIGS. 2 and 3 and the block wiring diagram of FIG. 22.

In FIG. 22 limit switch 210 is designated LSA. Limit switch 162 is designated LSB and limit switch 164 is designated LSC. These limit switches are designated in this manner so as to simplify a description of the operation of their various contacts.

At completion of a cycle of the machine, the carriage 12, the feed bar 24 and the electrode wheel 54 are disposed generally in the positions illustrated in FIG. 4 and diagrammatically in FIG. 3. Feed bar 24 is extended fully to the right and carriage 12 is likewise positioned fully to the right. The workpiece 34 has been rotated 360°+. At the completion of a cycle, when feed bar 24 reaches the position illustrated in FIGS. 3 and 4, limit switch LSA (210) is tripped.

Upon tripping of limit switch LSA the following occurs:

(1) The normally closed contact 1LSA opens, thus turning off the R.F. power supply 400 by disconnecting it from the 440 v. 60 cycle power source 402.

(2) The normally closed contact 2LSA in circuit with the carriage pulse motor 14 opens, thus stopping movement of the carriage to the right by disconnecting the RIGHT SLOW CIRCUIT 403 between the slow rate portion of the pulse generator 404 and the carriage pulse motor 14.

(3) The normally open contact 3LSA, which is in circuit with the vertical slide pulse motor 44, closes, thus closing the RAISE WHEEL FAST CIRCUIT 405 between the A.C. drive 406 and the vertical pulse motor 44. The electrode wheel 54 is thus raised at a fast rate for a predetermined time interval determined by the setting of a wheel timer, the contact of which is shown at 408. After the lapse of the predetermined time interval for which the timer is set, the normally closed delay contact 408 of the timer opens, thus stopping the vertical travel of the electrode wheel.

(4) Normally open contact 4LSA between the A.C. source 410 and cycle counter 412 closes, stepping the cycle counter down to the next lower count. If cycle counter 412 is stepped down to zero, the CYCLE COMPLETE light 414 is illuminated through the normally open Counter=0 contact 416. At the same time the normally closed Counter≠0 contact 418 in circuit with pulse motor 14 opens, thus stopping the cycle by disconnecting the CARRIAGE LEFT FAST CIRCUIT 419 between the A.C. drive 406 and pulse motor 14. On the other hand, if a pulse count remains in cycle counter 412, the next cycle begins.

If a pulse count remains in cycle counter 412, the following then occurs:

(1) Normally open contact 5LSA closes, reversing the carriage pulse motor by completing the CARRIAGE LEFT FAST CIRCUIT 419 through the Counter≠0 contact 418. This contact remains closed with any plus count on cycle counter 412.

(2) The CARRIAGE LEFT FAST CIRCUIT 419 is locked in through the locking contact 420 and the normally closed 1LSC contact in parallel with 5LSA contact so as to prevent stopping of the carriage pulse motor 14 when the feed bar 24 releases microswitch LSA.

(3) At this time an interlock circuit not shown is energized, which opens the normally closed interlock contact 422 in series with the R.F. power supply 400, and this prevents the R.F. power supply from being turned on when microswitch LSA is released.

(4) Feed bar 24 continues moving to the left at its maximum speed and rotates workpiece 34 in a clockwise direction back to the zero position.

(5) When feed bar 24 releases microswitch LSA, the normally close contact 1LSA closes, but the R.F. power supply 400 remains de-energized by reason of the interlock contact 422 being open.

(6) Normally closed contact 2LSA closes when microswitch LSA is released so as to arm the CARRIAGE RIGHT SLOW CIRCUIT 403. However, the gap sensing contact 423 in this circuit remains open until the R.F. power supply 400 is energized.

(7) Normally open contact 3LSA opens to reset RAISE WHEEL FAST CIRCUIT 405 and its associated timer.

(8) Normally open contact 4LSA opens to reset the counter 412 for the next count.

(9) Normally open contact 5LSA opens, but the feed bar 24 continues to travel to the left at the rapid rate by reason of the interlocking circuit in which locking contact 420 and contact 1LSC are located.

(10) When the workpiece is driven back to the 0° position, nut 22 on feed bar 24 engages yoke 26 on carriage 12 and starts to drive the carriage in the direction toward the left at the rapid rate. As the carriage is driven to the left by feed bar 24, it shifts the dressing tool 30 toward the electrode wheel 54. Since the feed bar 24 and carriage 12 are traveling to the left as a unit, the workpiece 34 remains at the 0° position. Eventually the reset button 176 on the carriage engages the spring biased plunger 168 and the latter trips microswitch LSB (162).

When microswitch LSB is tripped, the following occurs:

(1) Normally closed contact 1LSB opens to prevent the R.F. power supply 400 from being energized while the carriage is in the dress area. The dress area may be defined as the carriage travel between switches LSB and LSC.

(2) The normally closed interlock contact 422 in circuit with the R.F. power supply is opened.

(3) Normally open contact 2LSB closes, so as to arm the LOWER WHEEL SLOW CIRCUIT 424.

(4) Normally open contact 3LSB closes to arm the CARRIAGE RIGHT SLOW CIRCUIT 403.

(5) Microswitch LSB is held in the tripped position by the spring loaded plunger 168, so the carriage continues moving to the left and causes the dressing tool to move to the wheel dress position illustrated in FIG. 2.

(6) When the dressing tool 30 reaches the wheel dress position just to the left of the vertical center line of the electrode wheel 54, contact button 198 on the end of feed bar 24 has engaged the spring biased rod 190 and the latter trips microswitch LSC (164).

When microswitch LSC is tripped, the following occurs:

(1) Normally closed contact 1LSC in the CARRIAGE LEFT FAST CIRCUIT 419 opens, thus de-energizing the carriage pulse motor 14 to stop the carriage in the wheel dress position. The opening of 1LSC breaks the locked-in feature of the CARRIAGE LEFT FAST CIRCUIT and it remains unlocked until the next cycle.

(2) Normally open 2LSC contact closes, completing the LOWER WHEEL SLOW CIRCUIT 424 and connecting the vertical pulse motor 44 with the slow rate portion of pulse generator 404. The electrode wheel 54 starts to descend slowly at a fixed pulse rate.

(3) Normally open contact 3LSC closes, thus arming the WHEEL TOUGH CIRCUIT generally designated 426. The electrode wheel stops descending upon contacting the dressing tool 30.

(4) When the wheel contacts dressing tool 30, the WHEEL TOUGH CIRCUIT 426 opens the normally closed contact 428 in the LOWER WHEEL SLOW CIRCUIT 424 and starts a timer which maintains the carriage in the wheel dress position for a preselected dwell time.

(5) At the end of the dwell time the normally open timer delay contact 430 closes, thus completing the CARRIAGE RIGHT SLOW CIRCUIT 403 through the previously closed contact 3LSB. Contact 3LSB is held closed while the carriage is in the wheel dress area.

(6) Feed bar 24 starts traveling to the right at a slow rate, carrying carriage 12 with it and releasing microswitch LSC.

When microswitch LSC is released, the following occurs:

(1) Normally closed contact 1LSC closes, thus resetting the locking-in feature of the CARRIAGE FAST CIRCUIT 419.

(2) Normally open contact 2LSC opens, to keep the LOWER WHEEL SLOW CIRCUIT 424 disconnected until the next dress operation.

(3) Normally open contact 3LSC opens to reset the WHEEL TOUGH CIRCUIT 426, and then the normally closed contact 428 closes to rearm the LOWER WHEEL SLOW CIRCUIT 424.

The carriage thus continues to travel slowly to the right. Eventually the spring loaded plunger 168 releases LSB.

When LSB is released, the following occurs:

(1) Normally open contact 3LSB opens, thus opening the circuit between the slow rate portion of the pulse generator and the carriage pulse motor 14.

(2) At the same time normaly closed contact 4LSB in the CARRIAGE RIGHT RAPID CIRCUIT 432 closes and the rapid pulse timer is activated. The closing of contact 4LSB thus starts the carriage moving in a rapid pulse motion to the right through the timer delay contact 434. The normally closed contact 436 of the rapid pulse timer opens the other leg of the CARRIAGE RIGHT SLOW CIRCUIT 403. Its normally open lock contact 438 closes, but the gap sensing contact 440 in the CARRIAGE RAPID CIRCUIT 432 remains open.

(3) Normally closed contact 1LSB closes, thus energizing the R.F. power supply 400 and an R.F. voltage occurs across the workpiece and the electrode wheel.

(4) The gap sensing circuit, generally designated 442, compares the R.F. gap voltage against a reference feed voltage not shown, and with the proper feed setting the gap voltage will be higher than the reference feed voltage during open gap condition and the two gap sensing contacts 423 and 440 will close. The arrangement preferably is such that erosion of the workpiece will not occur until a gap of about .0001" to .005" is established. The smaller the gap voltage, the smaller the gap must be to ionize the dielectric oil directed between the workpiece and the electrode wheel.

(5) Although the normally open gap sensing contact 423 closes, the operation is not affected since the normally closed rapid pulse contact 436 holds that leg of the CARRIAGE RIGHT SLOW CIRCUIT in open condition.

(6) When normally open gap sensing contact 440 closes, it completes the locking feature in the circuit around the rapid pulse timer delay contact 434. Carriage 12 thus continues to travel in the direction to the right at the rapid pulse rate.

(7) Eventually the rapid pulse timer times out and its delay contact 434 opens. However, the carriage continues to move to the right because the circuit to the carriage pulse motor 14 is closed through the rapid timer locking contact 438 and the gap sensing contact 440.

(8) As the workpiece approaches the electrode wheel, the gap therebetween becomes progressively smaller until a point is reached where the R.F. gap voltage will ionize the dielectric oil and thus discharge through the workpiece, eroding a small crater in its surface. The gap sensing voltage will then drop to a value below the reference feed voltage, and both gap sensing contacts 423 and 440 will open.

(9) When gap sensing contact 440 opens, the locking feature of the carriage right rapid circuit 432 is broken and the carriage momentarily stops. However, at this time the normally closed rapid pulse timer contact 436 closes, thus arming the CARRIAGE RIGHT SLOW CIRCUIT 403.

(10) As the stock of the workpiece is eroded away, the R.F. gap voltage will progressively rise to a value above the reference feed voltage and the gap sensing contacts 423 and 440 will again close. Although gap sensing contact 440 closes, the operation is not affected, since the rapid pulse timer locking contact 438 is open. However, the closing of gap sensing contact 423 completes the CARRIAGE RIGHT SLOW CIRCUIT 403 and the carriage will travel slowly to the right, starting and stopping on demand as described above, in accordance with the value of the gap voltage. The carriage continues moving to the right until the armature plate 178 on the carriage engages the magnetic stop 180. This limits the extent of carriage travel to the right and determines the full depth of cut on the workpiece. However, the carriage pulse motor 14 continues to drive the feed bar and this in turn starts to rotate the workpiece. The workpiece will be fed into the electrode wheel by rotation under the control of the gap sensing contact 423 which opens and closes with variations in the gap voltage.

When the feed bar 24 is extended fully to the right to the position shown in FIGS. 3 and 22, it trips switch LSA and turns off the R.F. power supply 400. Then as previously described, the feed bar stops, the electrode wheel 54 is raised and the cycle counter 412 is pulsed. The machine cycle is then complete, unless, of course, the cycle counter 412 calls for another cycle, in which case the contact 418 (Counter≠0) remains closed and the feed bar starts moving to the left to repeat the entire cycle just described.

We claim:

1. In a machine for removing metal by electrical disintegration, of the type which includes a base, a carriage movable on the base and having a work-supporting spindle journalled thereon, that improvement which comprises a feed bar on said base disposed with its axis extending transversely of the work-supporting spindle, said feed bar being flat at one side thereof with said flat side in rolling engagement with the work-supporting spindle, a shaft on said carriage parallel to the work-supporting spindle and aligned therewith on the opposite side of the feed bar, said shaft having a pair of conical rollers thereon, the conical surfaces of said rollers engaging said feed bar, means urging said conical rollers toward each other to bias the feed bar into rolling engagement with the work-supporting spindle and means for feeding the feed bar axially to rotate the work-supporting spindle.

2. In a machine for removing metal by electrical disintegration, of the type which includes a base, a carriage movable on the base and having a work-supporting spindle journalled thereon, that improvement which comprises a feed bar on said base disposed with its axis extending transversely of the work-supporting spindle and in rolling contact with the work-supporting spindle and means for feeding the feed bar axially to rotate the work-supporting spindle, said carriage and said feed bar having interengageable abutments thereon forming a driving connection therebetween, the stroke of the feed bar being greater than that of the carriage such that when said abutments are interengaged the feed bar moves the carriage and the work-supporting spindle is translated, and when said abutments are not interengaged the feed bar moves relative to the carriage and the work-supporting spindle is rotated.

3. The combination set forth in claim 2, wherein said abutments form a unidirectional driving connection between the feed bar and the carriage.

4. The combination set forth in claim 3, including means biasing the carriage in a direction to maintain interengagement of said abutments.

5. The combination set forth in claim 4, including stop means on the base and said carriage for limiting movement of the carriage in a direction opposite to said unidirection, said feed bar being shiftable when said carriage is in engagement with said stop means on the base to shift the abutment thereon out of engagement with the abutment on the carriage.

6. The combination called for in claim 5, including means tending to frictionally resist rotation of said spindle, said biasing means being of sufficient strength to overcome said friction means.

7. In a machine for removing metal by electrical disintegration, the combination comprising a base, a support on said base, an electrode wheel journalled for rotation on said support and adapted to be connected with a source of high frequency current, a carriage guided for movement on said support in a path extending transversely to the axis of rotation of the electrode wheel, a work-supporting spindle journalled on the carriage for rotation about an axis spaced from and generally parallel to the axis of rotation of the electrode wheel, a feed bar on said support means for reciprocating the feed bar in a path parallel to the path of travel of the carriage, means forming a lost-motion driving connection between the feed bar and the carriage, interengageable stop means on the carriage and base for limiting travel of the carriage in one direction to a position wherein a workpiece on the spindle is in operative relation to the electrode wheel and means interconnecting the feed bar and the spindle for rotating the spindle in response to relative movement between the feed bar and the carriage.

8. The combination set forth in claim 7, wherein the feed bar is retractable and said driving connection comprises abutment means on said carriage and said feed bar, said abutment means being spaced apart when the stop means on the carriage and base are interengaged and said feed bar is adjacent one end of its stroke.

9. The combination set forth in claim 8, including means biasing the carriage in a direction such as to produce interengagement of said stop means on the base and carriage, said abutment means interengaging when the feed bar is fed in a direction toward the opposite end of its stroke to overcome said biasing means.

10. The combination set forth in claim 9, wherein said biasing means comprises a counterbalance connected with the carriage.

11. In a machine for removing metal by electric disintegration, the combination of a base, a support on said base, an electrode wheel journalled for rotation on said support and adapted to be connected to a source of high frequency current, a carriage on said base guided for movement in a path transversely of the axis of rotation of the electrode wheel, said carriage having a work-supporting spindle thereon journalled for rotation about an axis generally parallel to the axis of rotation of the electrode wheel, said carriage also having a wheel dresser mounted thereon, the work-supporting spindle and the dresser being arranged such that when the carriage is moved along said path the dresser and the work on the spindle are adapted to successively move into operative relation with the electrode wheel, a feed bar guided for movement on said base in a path parallel to the path of movement of the carriage, said feed bar and carriage having interengageable abutments thereon such that when the bar is shifted in one direction the abutments interengage and cause the carriage to move with the feed bar in said one direction, said base and carriage having stop means thereon for limiting movement of the carriage in the direction in which the carriage is driven by the bar to a position wherein the dresser is in operative position relative to the electrode wheel, said base and carriage having a second stop means thereon for limiting travel of the carriage in the opposite direction to a position wherein the work on the spindle is in operative relation with the electrode wheel and means interconnecting said feed bar and work spindle such that when the feed bar moves relative to the carriage, said spindle is rotated.

12. The combination called for in claim 11, including means for retaining the carriage in engagement with the second-mentioned stop until the abutment on the carriage and feed bar interengage.

13. The combination called for in claim 12, wherein said last-mentioned means comprises a magnet.

14. The combination called for in claim 11, including means biasing the carriage in a direction tending to produce interengagement of said abutments.

15. The combination called for in claim 11, wherein the feed bar has a frictional driving connection with the carriage when driven in said opposite direction.

16. The combination set forth in claim 11, wherein said stop means are adjustable to vary the operative positions of the dresser and the work spindle relative to the electrode wheel.

17. The combination set forth in claim 11, wherein the electrode wheel is movable on the support toward and away from the carriage.

18. The combination set forth in claim 17, including a motor for moving the electrode wheel on said support, means forming an electrical circuit which includes said wheel and said dresser and means responsive to closing of said circuit by contact of the wheel with the dresser for de-energizing said motor to thereby arrest movement of the wheel toward said dresser and thereby establish the operative position of the wheel dresser relative to the wheel.

19. The combination set forth in claim 18, including means for rotating said electrode wheel and means for adjusting the operative position of the wheel dresser laterally relative to the electrode wheel whereby the amount of material removed from the wheel by the dresser when the dresser is caused to traverse the rotating wheel varies in accordance with the lateral spacing between the adjusted operative position of the dresser and the line of travel of the wheel axis.

20. In a machine for removing metal by electrical disintegration, the combination comprising a base, a support on the base, an electrode wheel journalled for rotation on said support and adapted to be connected to a source of high frequency current, a carriage guided on said base for movement in a path transversely of the axis of rotation of the electrode wheel, said carriage having a work-supporting spindle thereon journalled for rotation about an axis generally parallel to the axis of rotation of the electrode wheel, a feed bar on said base, means for reciprocating said feed bar in a path parallel to the path of travel of the carriage, means interconnecting the feed bar and the work-supporting spindle such that when the feed bar moves relative to the carriage the spindle is caused to rotate, friction means tending to prevent rotation of said spindle and to reciprocate the carriage with the feed bar and stop means on said base engageable by the carriage to limit travel of the carriage in one direction to a position such that the workpiece on the spindle is in operative position relative to the electrode wheel, said means interconnecting the spindle and the feed bar being adapted to overcome said friction means to produce rotation of the spindle when the feed bar continues to move after the carriage has engaged said stop means.

21. The combination set forth in claim 20, wherein the work-supporting spindle has a cylindrical portion in rolling contact with an axially extending portion of the feed bar and means urging the feed bar in a direction transverse to its longitudinal axis against said cylindrical portion of the work-supporting spindle.

22. The combination set forth in claim 21, wherein said last-mentioned means comprise a pair of axially aligned frustoconical rollers having the conical portions thereof engaging the feed bar on the side thereof opposite the side engaged by the work-supporting spindle and means biasing said rollers axially toward each other.

23. In a machine for removing metal by electrical disintegration, the combination of a base, a support column on the base, an electrode wheel on said column journalled for rotation about a generally horizontal axis and movable vertically on said column, a carriage guided for movement on said base in a generally horizontal, rectilinear path, a work-supporting spindle journalled on said carriage for rotation about a generally horizontal axis, a feed bar guided on said base for axial movement in a path parallel to the path of movement of the carriage, said feed bar being operatively connected with said work-supporting spindle such that when the feed bar moves axially relative to the carriage the work-supporting spindle is rotated, means forming interengageable abutments on the feed bar and carriage such that when the feed bar moves in one direction said abutments interengage and the carriage is driven by the feed bar in said one direction, said carriage having a wheel dresser thereon spaced from the work-supporting spindle, means on said base for limiting travel of the carriage in said one direction to a position wherein the wheel dresser is in operative position relative to the electrode wheel, means for limiting travel of the carriage in the opposite direction to a position wherein the work-supporting spindle is in operative position relative to the electrode wheel, means forming a high frequency circuit which includes the electrode wheel and the work-supporting spindle such that when said circuit is energized and the work is in operative position with the electrode wheel the electrical discharge therebetween results in removal of metal from the workpiece, a motor for reciprocating said feed bar, a motor for moving the electrode wheel vertically on said column and means in circuit with said motors for producing the following sequence of operations when the carriage is at the end of its stroke wherein the dressing tool is in operative position relative to the electrode wheel: first, moving the feed bar and the carriage in said opposite direction to move the spindle-supported workpiece toward the electrode wheel and thereby causing the dresser to traverse the electrode wheel and dress it, then energizing the high frequency circuit, closing the high frequency circuit when the work reaches a predetermined position relative to the electrode wheel to produce an electric discharge therebetween, continuing movement of the feed bar and carriage in said opposite direction until the carriage positions the workpiece in said operative position, continuing movement of the feed bar in said opposite direction until the work spindle is rotated through an arc of over 360°, then de-energizing the high frequency circuit, driving the feed bar in said one direction and raising the electrode wheel, then shifting the carriage in said one direction to said end of its stroke and at said end of the stroke stopping travel of the feed bar and lowering the electrode to its operative position relative to the dresser.

24. The combination called for in claim 23, including means for forming a circuit which includes the wheel dresser and the electrode wheel and means responsive to closing of the said last-mentioned circuit between the electrode wheel and the dresser to stop the descent of the electrode wheel and energize the feed bar motor to drive the feed bar in said opposite direction.

25. The combination called for in claim 23, wherein the interengageable abutments on the carriage and feed bar are relatively adjustable so as to vary the position in the stroke of the feed bar where a driving connection is established between the feed bar and the carriage.

26. The combination called for in claim 23, wherein said means for limiting travel of the carriage in said opposite direction include a stop member on the base and a stop member on the carriage engaged by the stop member on the base, one of said stop members comprising a magnet and the other comprising a magnetic armature.

27. The combination called for in claim 23, wherein the feed bar motor is of the stepping type and including means for actuating said motor in response to the gap voltage between the electrode wheel and the work on the spindle.

28. The combination called for in claim 23, including a counterbalance connected to said carriage and urging said carriage in the direction of said one end of its stroke.

References Cited
UNITED STATES PATENTS

| | | | |
|---|---|---|---|
| 1,113,812 | 10/1914 | Mestel | 74—89.17 |
| 2,850,618 | 9/1958 | Rudorff | 219—69 |
| 3,122,628 | 2/1964 | Inoue | 219—69 |
| 3,341,679 | 9/1967 | Bender et al. | 219—69 |

RICHARD M. WOOD, *Primary Examiner.*

R. F. STAUBLY, *Assistant Examiner.*